United States Patent
Im

(10) Patent No.: US 6,469,460 B1
(45) Date of Patent: Oct. 22, 2002

(54) PORTABLE WIRELESS TERMINAL HAVING SEPARATED VIBRATION EMBODYING CIRCUIT FOR ALERTING A USER OF AN INCOMING CALL

(75) Inventor: Sang-Hyuk Im, Seoul (KR)

(73) Assignee: SamSung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 08/775,106

(22) Filed: Dec. 30, 1996

(30) Foreign Application Priority Data

Dec. 30, 1995 (KR) .............................. 95-67771

(51) Int. Cl.[7] .............................. H02P 5/00; H04B 1/00
(52) U.S. Cl. .................... 318/16; 318/257; 455/426; 361/30
(58) Field of Search .................... 318/139, 430–434, 318/599, 257; 455/426, 31.2, 567; 340/311.1, 825.44; 379/57, 61, 211; 361/20–45, 90–99

(56) References Cited

U.S. PATENT DOCUMENTS

| | | | |
|---|---|---|---|
| 4,066,934 A | * | 1/1978 | Waldorf et al. ............. 318/139 |
| 4,162,436 A | * | 7/1979 | Waldorf et al. ............. 318/139 |
| 4,599,548 A | * | 7/1986 | Schultz ...................... 318/599 |
| 4,667,121 A | * | 5/1987 | Fay et al. ................... 307/580 |
| 5,245,523 A | * | 9/1993 | Juzswik ...................... 363/56 |
| 5,722,071 A | * | 2/1998 | Berg et al. .................. 455/426 |
| 5,744,984 A | * | 4/1998 | Drapac et al. ............... 327/89 |

FOREIGN PATENT DOCUMENTS

| | | |
|---|---|---|
| EP | 0688125 A1 | 12/1995 |
| GB | 2279831 A | 11/1995 |

* cited by examiner

*Primary Examiner*—Paul Ip
(74) *Attorney, Agent, or Firm*—Robert E. Bushnell, Esq.

(57) ABSTRACT

A wireless terminal including a custom integrated circuit for adjusting and applying the voltage of a particular pulse and a power supply for supplying power to operate an internal vibration embodying circuit, the terminal includes: a switching circuit unit for controlling the motor action in the vibration embodying circuit: a current amplification unit for supplying a great current necessary for the driving of the motor; a driving motor unit for performing vibration by driving the vibration embodying circuit; an overcurrent protecting unit for maintaining a stable voltage in the motor when overvoltage is applied to an input and protecting the motor by interrupting said driving motor unit; and a battery pack, connected externally to the power supply, for supplying charges to the power supply unit by mounting the vibration embodying circuit therein.

3 Claims, 3 Drawing Sheets

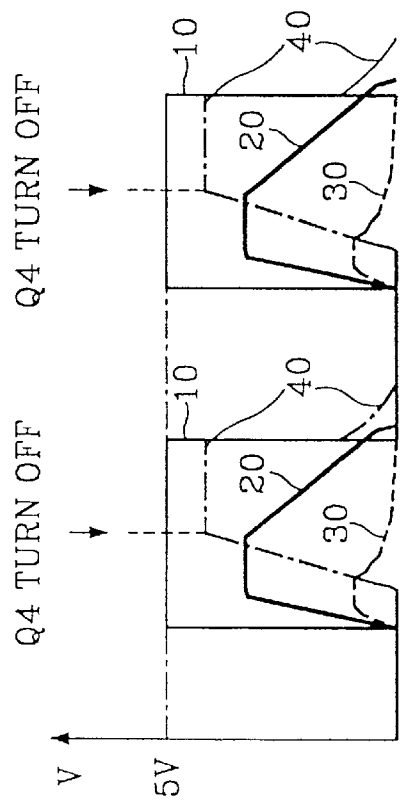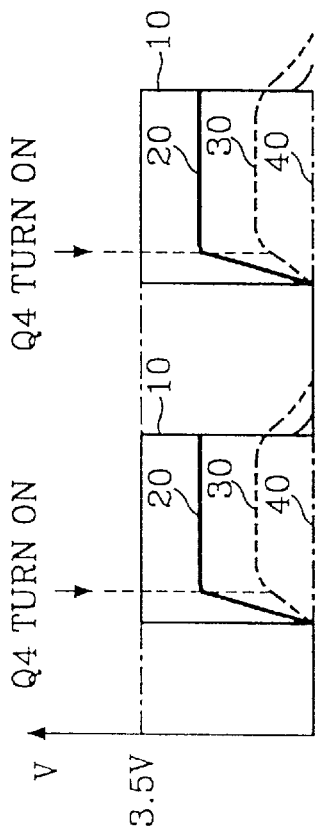
Fig. 3A
Fig. 3B

PORTABLE WIRELESS TERMINAL HAVING SEPARATED VIBRATION EMBODYING CIRCUIT FOR ALERTING A USER OF AN INCOMING CALL

CLAIM OF PRIORITY

This application makes claims all benefits accruing under 35 U.S.C. §119 from an application for PORTABLE WIRELESS TERMINAL HAVING SEPARATED VIBRATION EMBODYING CIRCUIT earlier filed in the Korean Industrial Property Office on Dec. 30, 1995 and there duly assigned Ser. No. 67771/1995.

BACKGROUND OF THE INVENTION

1. Field of the Invention

The present invention relates to a wireless terminal, and more particularly to a portable wireless terminal in which a vibration embodying circuit is separated from a main set to be built in a battery pack so that a compact and light set is possible.

2. Description of the Related Art

A portable wireless terminal has a silent vibration function in addition to an alert mode and to embody a conventional silent vibration function a vibration embodying circuit is usually built in a main set of the wireless terminal. Since the vibration embodying circuit is attached in a printed circuit board (PCB) in the main set of the portable wireless terminal, space taken by the circuit influences a compact and light terminal. The noise occurring at the vibration embodying circuit attached in the PCB effects a communication function of the terminal and a severe vibration causes damage to a part sensitive to the vibration. Also, it is a problem that a user cannot use the vibration function for a long time when the vibration embodying circuit gets damage.

SUMMARY OF THE INVENTION

To overcome the above problems, it is an object of the present invention to provide a portable wireless terminal in which a vibration embodying circuit is built in a battery pack for supplying power to the terminal by separating the vibration embodying circuit from a printed circuit board of a main set of the terminal, thereby enabling a compact and light set.

It is another object of the present invention to provide a portable wireless phone in which a noise source effecting the performance of the main set by building in the vibration embodying circuit in a battery pack, thereby improving the performance and reducing damage to radio frequency core parts.

Accordingly, to achieve the above objects, there is provided a wireless terminal including a custom integrated circuit for adjusting and applying the voltage of a particular pulse and a power supply for supplying power to operate an internal vibration embodying circuit, the terminal includes: a switching circuit unit for controlling the motor action in the vibration embodying circuit: a current amplification unit for supplying a great current necessary for the driving of the motor; a driving motor unit for performing vibration by driving the vibration embodying circuit; an overcurrent protecting unit for maintaining a stable voltage in the motor when overvoltage is applied to an input and protecting the motor by interrupting said driving motor unit; and a battery pack, connected externally to the power supply, for supplying charges to the power supply unit by mounting the vibration embodying circuit therein.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 3 is a graph indicating the relationship between a switching circuit and a motor input voltage, and a V/F and C/F input signal according to the present invention.

DETAILED DESCRIPTION OF THE PREFERRED EMBODIMENT

Figure 1:
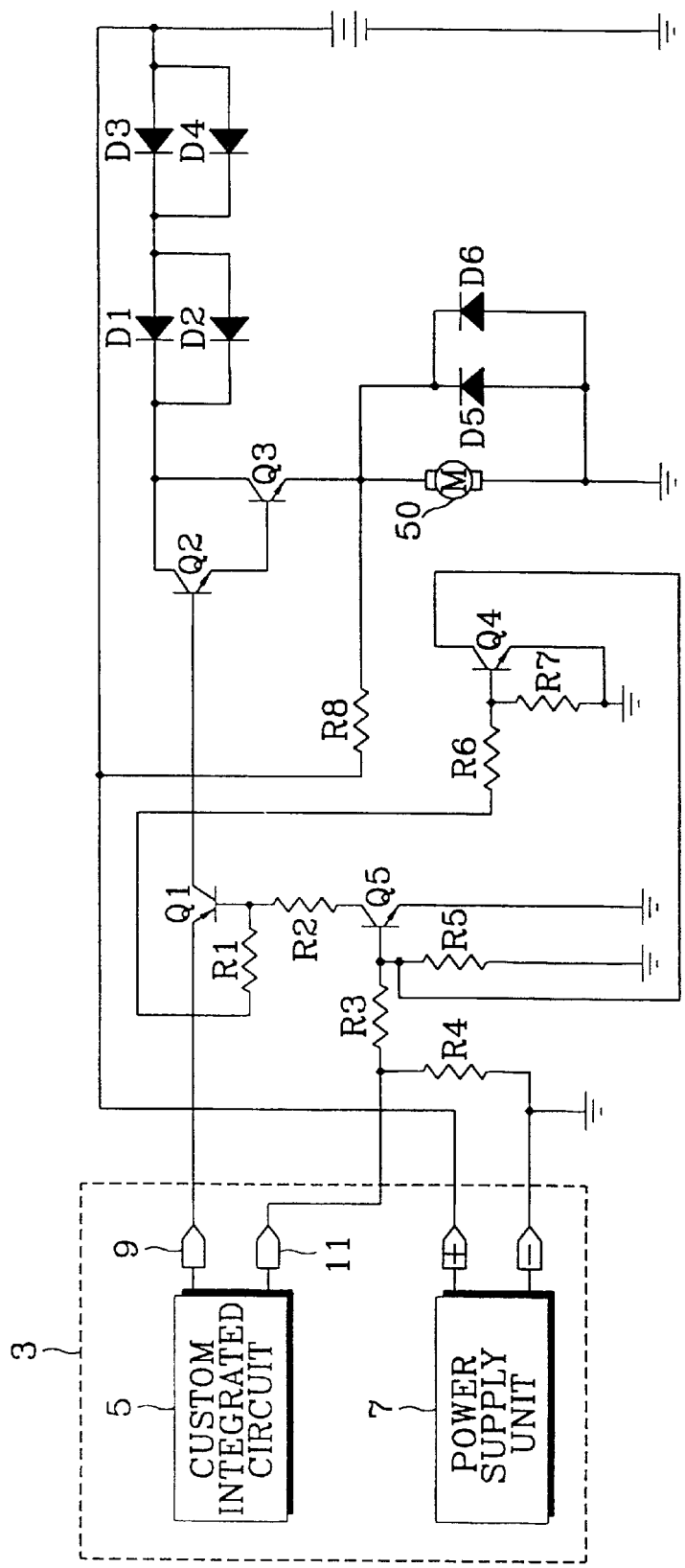
FIG. 1 is a block diagram of a portable wireless terminal according to the present invention.
Figure 2:
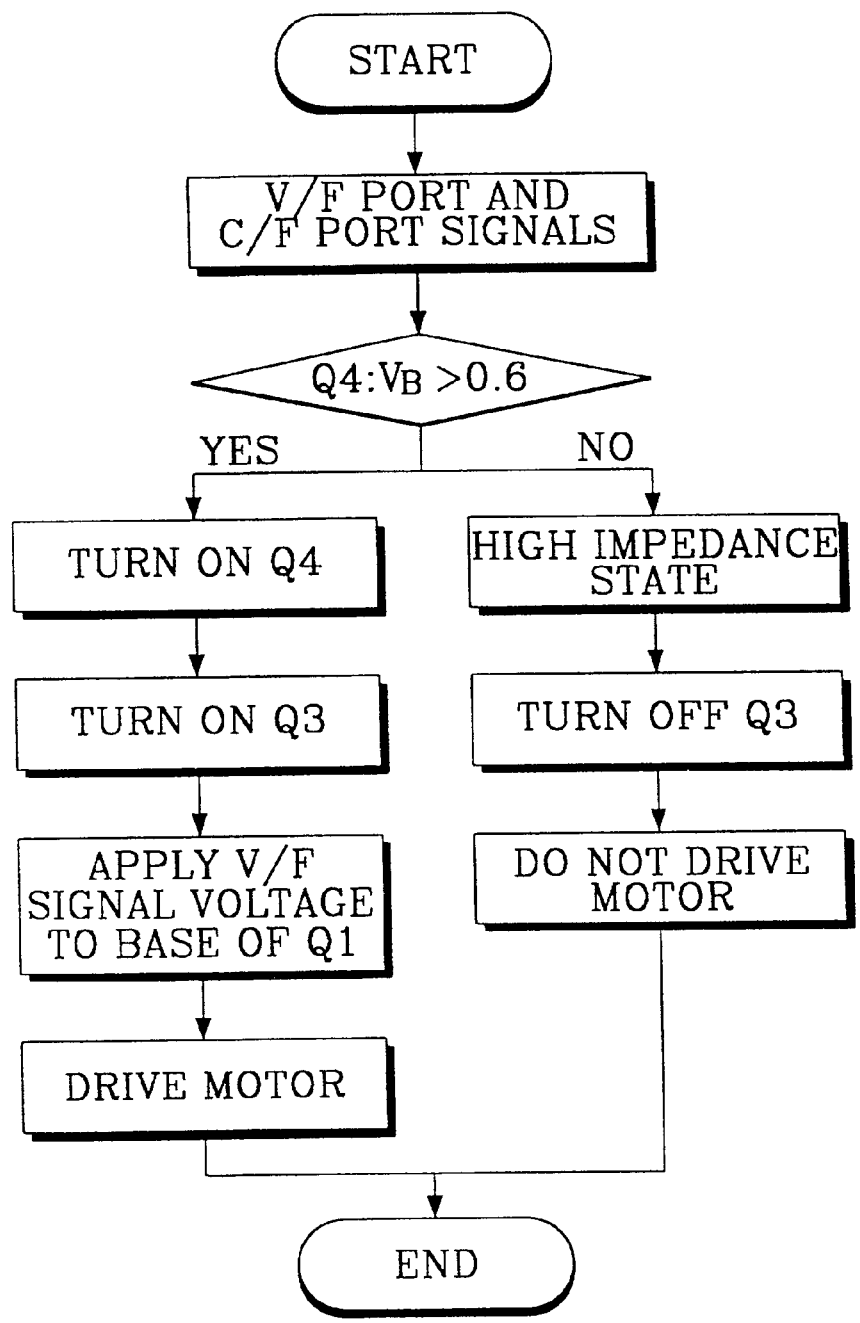
FIG. 2 is a flow chart for explaining the operation of the portable wireless terminal according to the present invention.

Referring to FIGS. 1 and 2, a battery pack is installed in a terminal to supply power. When an output port of a custom integrated circuit 3 becomes a logic of high, a V/F port 9 and a C/F port 11 concurrently become a logic of high. At this time, an NPN transistor Q4 is switched on and thus the collector voltage of the transistor Q4 becomes 0 V. Thus, as a PNP transistor Q3 is switched on, the voltage of the V/F port 9 is applied toward the base of a transistor Q1 which is an input port of a current amplifying circuit. At this stage, the applied low base current of the Q1 obtains a large current amplification gain due to a Darlington circuit constituted by the transistors Q1 and Q2 which is discontinuous, thus obtaining a large current necessary for driving a motor. Since a power supply directly uses a battery power, the battery power cannot directly loads a motor 50. The output of the power supply is to be passed through diodes D1 and D2 for voltage drop, and then, by making a feedback of a resistor R2 to the base of the transistor Q1 and the emitter of the transistor Q2, a stable voltage is maintained and a uniform current can be provided. The motor can be stabilized by connecting a D4 to prevent damage to the motor due to an instant current occurring during the driving on/off of the motor. When the output port of the custom integrated circuit 3 becomes a logic of low, the V/F port 9 and the C/F port 11 concurrently become a logic of low. At this time, as the NPN transistor Q4 is switched off, the collector of the transistor Q4 becomes a high impedance state and thus a signal voltage does not applied toward the current amplification circuit so that the motor is not driven. Also, to prevent motor damage due to overcurrent occurring when the instant voltage of the V/F port 9 and the C/F port 11 is greater than a reference voltage, a transistor Q5 is provided, thus connecting the voltage of the V/F port 9 toward the base of the transistor Q5 via an R1. As a result, when a high voltage is applied from an instant overcurrent, the transistor Q5 is turned on to drop the voltage of the base voltage of the transistor Q4 to 0 V. Therefore, the transistor Q3 is interrupted to thereby enable a stable operation of the motor.

FIG. 3 is a graph indicating the relationship between a switching circuit and a motor input voltage, and a V/F and C/F input signal according to the present invention. Referring to FIG. 3, a V/F and C/F input signal 10 is applied in a pulse type. Accordingly, it can be seen where the transistor Q4 which is a switching device is turned on or off according to a base voltage 30 and a collector voltage 40 and the change of a motor input voltage 20 can be easily known by the description of FIG. 1.

As described above, in embodying a vibration function of a portable wireless terminal according to the present invention, the vibration embodying circuit in a terminal body is embodied in an external connection portion, a battery pack, so that difficulties in design a printed circuit board and deteriorate performance of the apparatus can be solved, plus providing easy use to a user.

Therefore, it should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A wireless terminal including a custom integrated circuit for adjusting and applying a voltage of a particular pulse and a power supply for supplying power to operate an internal vibration embodying circuit, said terminal comprising:

a switching circuit unit for controlling action of a motor in said vibration embodying circuit:

a current amplification unit for supplying a high current necessary for driving said motor;

a driving motor unit for performing vibration by driving said vibration embodying circuit;

an overcurrent protecting unit for maintaining a stable voltage in said motor when overvoltage is applied to an input and protecting said motor by interrupting said driving motor unit; and a battery pack, connected externally to said power supply, for supplying charges to said power supply unit by mounting said vibration embodying circuit therein.

2. A wireless terminal as claimed in claim 1, said vibration embodying circuit performs a silent vibration action.

3. A wireless terminal as claimed in claim 1, said battery pack is separated from said wireless terminal.

* * * * *